April 29, 1969     G. WARREN ET AL     3,440,707

METHOD AND APPARATUS FOR REPAIRING GLASS-COATED ARTICLES

Filed May 8, 1967

INVENTOR.
GEORGE WARREN
BASIL G. STAPLES

BY *Theodore B Roessel*

ATTORNEY

United States Patent Office 3,440,707
Patented Apr. 29, 1969

3,440,707
METHOD AND APPARATUS FOR REPAIRING GLASS-COATED ARTICLES
George Warren Pittsford, and Basil G. Staples, Rochester, N.Y., assignors to Ritter Pfaudler Corporation, Rochester, N.Y., a corporation of New York
Filed May 8, 1967, Ser. No. 636,760
Int. Cl. B23p 7/00; B65d 41/52; F16l 55/16
U.S. Cl. 29—401
10 Claims

ABSTRACT OF THE DISCLOSURE

Defects or pits in the glass lining of corrosion resistant equipment are repaired by first removing glass from around the defect to expose an area of base metal which is large enough to drill and tap. A mild steel stud is threaded into this hole through the base of a deformable, heat sealable corrosion resistant plastic cup. A concave flange carried by the stud is adapted to bear at its peripheral edge against the base of the plastic cup to hold the base in sealing contact with the glass lining about the defect. The open end of the cup is then closed by sealing the walls of the cup together to completely enclose the stud and flange. For additional protection the cup can be filled prior to sealing with an agent for neutralizing the enivornment in which the article is to be used.

---

This invention relates to corrosion resistant articles such as containers, pipes, fluid agitators, baffles and the like having a metal base and a protective coating of glass, vitreous enamel or other resistant material, and more particularly, to an apparatus and method for repairing defects in the protective coating of such articles.

There are several methods of effecting a repair to glass lined equipment, the most satisfactory of these methods being described in Patents Nos. 2,631,360 and 2,917,819. These patents generally show the use of a threaded repair plug, having an outwardly extended flange for covering the damaged portion of the glass lining, the plug and flange both being made of a corrosion resistant material. In Patent No. 2,631,360, for example, a flexible concave flange carried by the plug is held in sealing contact with the glass surrounding the defect by means of a corrosion resisting cement or gaskets in combination with the cement. The method illustrated in Patent 2,917,819 uses a plug which has a rigid, generally, planar flange, the glass surrounding the defect being ground to a flat to form a seat for the flange.

In the former method the plug, nut and flange were made from a metal which is not attacked by the corrosive material in contact with repair. Tantalum commonly is used because it is the most versatile metal available but certain environments which attack tantalum call for the use of other metals such as gold, platinum, silver, the high nickel-chromium alloys, nickel, Monel, titanium, zirconium and stainless steel. While a repair utilizing a plug made from one of these metals has proved suitable for a wide variety of applications, these metals are not always readily available and there is a relatively high cost involved in manufacturing a repair plug, nut and flange from any of the metals described, such as tantalum, gold, platinum, silver, etc. Also, there are certain products which must be held in a non-metallic environment as any exposure to even a trace of metal would result in breakdown and degradation of the product. Furthermore, some chemical processes must be carried out in the absence of metals as any metal, even tantalum or platinum, would catalyze the process although the metal itself would be unaffected.

Patent No. 2,917,819 provides a method for repairing glass coated apparatus which can be used in situations which will not tolerate a metal repair plug. In the method shown in this patent, all exposed surfaces of the plug and flange are provided with a coating of glass, vitreous enamel or the like to prevent exposure of the metal. However, when using such a glass coated plug to effect a repair, care must be taken to prevent fracture of the coating on the plug when using tools such as wrenches to attach the plug to the glass coated apparatus.

It would be highly desirable to have a method for repairing glass coated equipment which permits use of an inexpensive, uncoated plug not subject to the difficulties discussed above. This is accomplished by the present invention which, in general, is exemplified by use of a mild steel repair plug attached to the apparatus to be repaired and enshrouded in a sealable corrosion resistant material, such as the polymeric fluorocarbon polytetrafluoroethylene or any other polymerized fluorinated and chlorinated hydrocarbon. Polytetrafluoroethylene is a preferred polymeric fluorocarbon particularly under highly corrosive conditions, but it should be understood that any polymerized fluorinated and chlorinated hydrocarbon or any soft, deformable material such as sheet tantalum, gold or platinum can be used depending upon the severity of the chemical conditions involved. Polytetrafluoroethylene is preferred, however, because it is thermoplastic and can be heat sealed. Furthermore, this material provides both corrosion protection for the mild steel repair plug and insulates the surrounding material, which may be catalyzed or degraded upon contact with metal, from the metal repair plug. Further corrosion protection for the repair plug and insulation of the repair from the surrounding environment can be provided by placing within the shroud and about the repair plug prior to heat sealing, an agent which will neutralize the environment in case the environment should diffuse through the shroud. Thus, if the enshrouding material should leak the neutralizing agent will act to neutralize the effects of the environment before the corrosive materials attack the mild steel repair plug.

Accordingly, it is an object of our invention to provide the method and apparatus for repairing articles having a corrosion resisting coating in which a neutralizing agent is encapsulated within a corrosion resisting, sealable material and about a repair plug assembly, the agent acting to neutralize the effect of the environment in which the article is used on the repair plug assembly should the sealable corrosion resisting material fail.

Another object of our invention is to provide apparatus and method for repairing articles having a corrosion resisting coating which utilizes a repair plug assembly made partly from a material that will not resist corrosion attack by the environment in which the repaired article is used.

A further object of our invention is to provide a method and apparatus for repairing articles having a corrosion resisting coating in which a soft, deformable corrosion resisting material is sealed about a repair plug assembly including a stud, flange and nut made from a material which will not resist corrosion attack by the environment in which the repaired article is used.

Yet another object of our invention is to provide a method and apparatus for repairing the non-metallic coatings of articles used in environments where metals cannot be tolerated which utilizes a metallic plug to affect a repair.

A still further object of our invention is to provide a low cost method and apparatus for repairing glass coated articles.

These and other objects, advantages and characterizing features of our invention will become more apparent upon a consideration of the following detailed description thereof when taken in conjunction with the accompanying drawings depicting the same in which.

The method and apparatus of our invention for repairing defects in the corrosion resistant coatings of articles can be characterized in one aspect thereof by the provision of a repair stud, concave flange and nut made of a material which is rigid, but which need not be corrosion resistant, and a generally cup-shaped element having a base and an upstanding peripheral wall, the element being made of a material which is soft, deformable and corrosion resistant. The stud is first inserted through the base of the element and attached to the article at the defect and the nut and flange tightened on the stud to force the base of the element into fluid tight engagement with the corrosion resistant coating around the defect. The upstanding wall of the element is then sealed to close the opening of the cup-shaped element over the stud, flange and nut.

Figure 1:
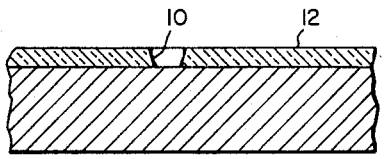
FIGURE 1 is a sectional view of a portion of an article such as a container wall having a metal base and a glass coating containing a discontinuity to be repaired.
Figure 2:
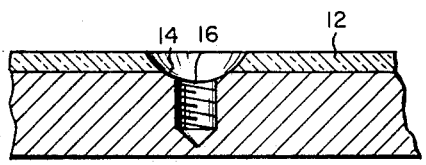
FIGURE 2 is a view similar to FIGURE 1 showing the glass ground away from the discontinuity and a hole drilled and tapped into the base metal.
Figure 3:
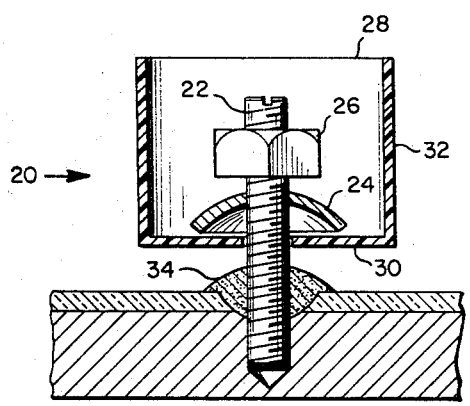
FIGURE 3 is a view showing the components of the repair plug assembly of our invention, the stud of the assembly being screwed into the tapped hole and cemented into place.

In accordance with the methods of our invention when a discontinuity such as a pit or break 10 (FIGURE 1) in the coating 12 of a glass or vitreous enamel lined container is discovered, the glass adjacent the break or pit is preferably removed by grinding to leave the surrounding glass in a sound condition with smooth edges. As shown in FIGURE 2 the grinding is preferably continued until a section of base metal 14 is uncovered. A hole 16 is then drilled into the base metal adjacent the center of the exposed portion and tapped. As shown in FIGURE 3, the next step of the method is to attach the repair plug assembly of our invention, generally designated at 20 to the metal base. The repair plug assembly includes a threaded metal repair stud 22, a generally concave flange 24 and a nut 26 carried by the stud and a corrosion resistant cup-shaped element 28. Element 28 is made from a soft deformable material which is corrosion resisting and sealable, such as a thermoplastic, and includes a base portion 30 having a central hole 31 therethrough and a peripheral wall 32.

Assembly 20 is attached to the base metal by threading stud 22 into tapped hole 16 and cementing the stud in place with a self-hardening cement 34. While it is possible to eliminate the step of cementing stud 22 into place cementing is preferred as the method of insuring that the stud remains firmly in place.

Figure 4:
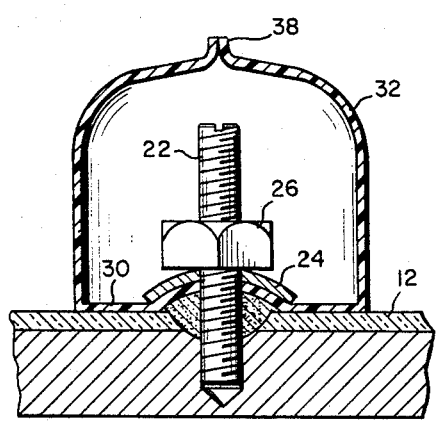
FIGURE 4 shows the article repaired by the repair plug assembly of our invention.

As shown in FIGURE 4, nut 26 is then tightened on the plug to carry flange 24 into engagement with element base 30. Further tightening of the nut causes the flange to deform base 30 against the glass lining so as to provide a fluid tight sealing contact with glass lining 12 along a line extending around the area to be repaired. The upper portions 38 of wall 32 are then bent together and sealed, by any suitable means such as heat sealing, cementing or welding to close the opening of the cup. Thus, with this method, stud 22, nut 26 and flange 24 are completely enshrouded in a corrosion resisting material which permits the stud, nut, flange and cement to be made from a non-corrosion resistant material.

Figure 5:
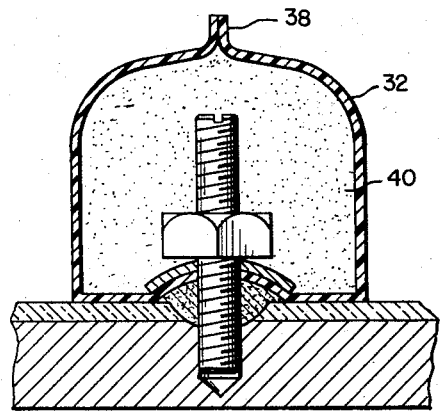
FIGURE 5 is a view similar to FIGURE 4, showing another embodiment of the apparatus of our invention.

FIGURE 5 shows another embodiment of the invention in which a neutralizing agent 40 is inserted into cup 28 prior to sealing upper portion 38 of wall 32 together. For example, if the article having the defective glass coating is used in an environment which is acidic, a neutralizing agent which is basic is inserted into cup 28. Thus, if a leak should develop in cup 28 or if the acid were to diffuse through wall 32, the acid would be neutralized by agent 40 before coming in contact with the non-corrosion resistant repair stud, flange, or nut. While it is preferable to fill the entire volume of the shroud with a neutralizing agent as shown in FIGURE 5, it should be appreciated that any amount of neutralizing agent would help to protect stud 22, flange 24 and nut 26 from corrosive attack.

Figure 6:
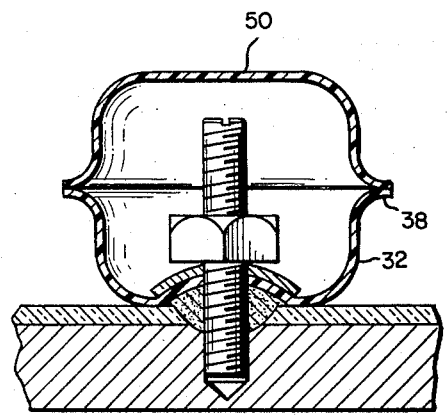
FIGURE 6 is a view showing still another embodiment of the apparatus of our invention.

FIGURE 6 shows another embodiment of the invention in which a cover 50 is provided for cup 28. In this respect, the upper portions 38 of wall 32 are bent upwardly and outwardly to permit the cover to be sealed to wall 32 in an annular seam. The shroud thus formed may be filled or partly filled with a neutralizing agent (not shown).

Thus, it will be appreciated that the present invention accomplishes its intended objects providing the method and apparatus for repairing glass coated articles which is both inexpensive and effective. Because the stud, flange and nut of the present invention need not be made of relatively expensive corrosion resistant materials, a repair can be made which is less expensive than a repair made according to the current methods. For example, it has been estimated that the cost of effecting a repair with the apparatus and method of the present invention is approximately 1/7 of the cost of current repair methods which use components made from tantalum. The provision for incapsulating a neutralizing agent within the shrouding material provides still further protection for the stud, nut, and flange.

While we have described the preferred embodiment of our invention, it will be apparent that various modifications can be made therein without changing the spirit and scope of the invention as claimed.

Having described our invention in detail, what we claim as new is:

1. The method of repairing corrosion resisting articles adapted for use in corrosive environments having a metal base and a corrosion resistant coating thereon containing a damaged area to be repaired comprising the steps of:
 (a) drilling a hole in said metal base substantially at the center of said damaged area;
 (b) overlaying said area and adjacent portions of said coating with a soft, deformable element made of a corrosion resistant material and having protruding edges;
 (c) inserting a threaded repair plug through said element and fastening the same in said hole, said plug being provided with a flange adapted to bear at its edges on said element to hold the same in sealing contact with said coating along a line surrounding said area; and
 (d) sealing said protruding edges to cover said repair plug and flange to provide a corrosion resistant shroud therefor, whereby said shroud protects said repair plug and flange against the action of said corrosive environment.

2. The method as set forth in claim 1 further comprising the step of bending said protruding edges upwardly over said repair plug and flange prior to sealing.

3. The method as set forth in claim 1 further comprising the steps of:
 (a) bending said protruding edges upwardly;
 (b) placing a corrosion resistant cover over said repair plug and flange; and
 (c) sealing the peripheral edge of said cover to said upwardly bent protruding edges, whereby said cover and protruding edges together define a corrosion resistant shroud for said repair plug and flange.

4. The method as set forth in claim 1 in which said soft, deformable element is made of a heat sealable polymeric fluorocarbon.

5. The method as set forth in claim 1 further comprising the step of cementing said repair plug to said base.

6. The method as set forth in claim 1 further comprising the step of inserting a material adapted to neutralize said corrosive environment into the volume defined by said shroud.

7. A repair assembly for repairing corrosion resisting articles adapted for use in corrosive envionments having a metal base and a corrosion resistant coating thereon containing a defect to be repaired comprising:
(a) a soft, deformable corrosion resistant element overlaying said defect having a substantially central hole therethrough;
(b) a repair plug extending through said hole for attachment to said metal base;
(c) a flange carried by said repair plug for bearing at its edges on said element at a line surrounding said defect for sealing said element against said coating in fluid tight engagement; and
(d) the edges of said element being bent upwardly over said plug and flange and sealed in fluid tight engagement.

8. A repair assembly as set forth in claim 7 in which said element is made of a heat sealable polymeric material comprising:
(a) a base portion adapted to receive the bearing pressure of said flange; and
(b) a wall extending upwardly about the periphery of said base, the upper portions of said wall being heat sealed together about said repair plug and flange to form a corrosion resistant shroud therefor.

9. A repair assembly as set forth in claim 7 in which a corrosion resistant cover is disposed over said repair plug and flange, said cover having its peripheral edge aligned and sealed with said upwardly bent element edges in fluid tight engagement, whereby said element and cover together insulate said repair plug and flange from said corrosive environment.

10. A pair assembly as set forth in claim 7 further comprising an agent adapted to neutralize said corrosive environment enclosed about said repair plug and flange by said element.

References Cited

UNITED STATES PATENTS

| 2,631,360 | 3/1953 | Sanford et al. | 29—401 |
| 2,917,819 | 12/1959 | Britton et al. | 29—401 |
| 3,236,407 | 2/1966 | Zelman et al. | 220—24 |
| 3,365,097 | 1/1968 | Chase | 220—24 |

FOREIGN PATENTS 821,904 11/1951 Germany.

JOHN F. CAMPBELL, *Primary Examiner.*

D. C. REILEY, *Assistant Examiner.*

U.S. Cl. X.R.

52—514; 138—99; 220—24, 63